(12) United States Patent
Biester et al.

(10) Patent No.: US 8,638,005 B2
(45) Date of Patent: Jan. 28, 2014

(54) POWER SUPPLY SYSTEM

(75) Inventors: Klaus Biester, Wienhausen (DE); Peter Kunow, Berlin (DE)

(73) Assignee: Cameron International Corporation, Houston, TX (US)

( * ) Notice: Subject to any disclaimer, the term of this patent is extended or adjusted under 35 U.S.C. 154(b) by 1142 days.

(21) Appl. No.: 12/595,815

(22) PCT Filed: Apr. 13, 2007

(86) PCT No.: PCT/EP2007/003308
§ 371 (c)(1),
(2), (4) Date: Oct. 13, 2009

(87) PCT Pub. No.: WO2008/125137
PCT Pub. Date: Oct. 23, 2008

(65) Prior Publication Data
US 2010/0127566 A1    May 27, 2010

(51) Int. Cl.
*H02J 1/10* (2006.01)
(52) U.S. Cl.
USPC .......................................................... 307/18
(58) Field of Classification Search
USPC .......................................................... 307/18
See application file for complete search history.

(56) References Cited

U.S. PATENT DOCUMENTS

| | | | | |
|---|---|---|---|---|
| 7,261,162 B2 * | 8/2007 | Deans et al. | ................... | 166/336 |
| 7,615,893 B2 * | 11/2009 | Biester et al. | ................... | 307/82 |
| 2007/0262655 A1 * | 11/2007 | Lin et al. | ....................... | 307/140 |

FOREIGN PATENT DOCUMENTS

| | | |
|---|---|---|
| DE | 10297241 | 8/2004 |
| DE | 10297247 | 10/2004 |
| WO | WO0237640 | 5/2002 |
| WO | WO02072999 | 9/2002 |

OTHER PUBLICATIONS

PCT International Search Report and Written Opinion Dated Mar. 17, 2008 for Appl. No. PCT/EP2007/003308; (12 p.).

* cited by examiner

*Primary Examiner* — Hal Kaplan
(74) *Attorney, Agent, or Firm* — Chamberlain Hrdlicka

(57) ABSTRACT

A power supply system, particularly to be used in maritime oil/natural gas production includes at least one data transfer/voltage conversion unit arranged above sea level and one electrical means such as a choke, gate valve, production tree, power control/communication unit and the like arranged below sea level, which are electrically connected via a cable connection at least for power supply.

To improve such a power supply system in a manner that this system has a simple structure and each data transfer/voltage conversion unit can also provide higher powers over a predetermined period of time or during continuous operation, a plurality of data transfer/voltage conversion units are arranged modularly, and one additional power supply module can be connected thereto to increase the power supply, and the electrical power, respectively.

38 Claims, 4 Drawing Sheets

POWER SUPPLY SYSTEM

CROSS-REFERENCE TO RELATED APPLICATIONS

The present application claims priority to PCT/EP2007/003308 filed 13 Apr. 2007 and hereby incorporated herein by reference.

STATEMENT REGARDING FEDERALLY-SPONSORED RESEARCH OR DEVELOPMENT

Not applicable

BACKGROUND

A power supply system particularly to be used in maritime oil and natural gas production comprises at least one data transfer/voltage conversion unit arranged particularly above sea level, and an electrical means arranged below sea level, such as a subsea production tree comprising a choke, a gate valve, a power control/communication means or the like. These means are electrically connected at least to the power supply via a cable connection.

In maritime oil/natural gas production, a respective offshore building, such as a constructional and production unit, is usually connected to a production platform. This platform is connected to respective means of a subsea production system. Parts of this production system are chokes, gate valves, pumps, actuators or the like as part of for instance a subsea production tree. Lately, these different components have no longer been operated hydraulically, or at least they have not exclusively been operated hydraulically but have been operated electrically or at least controlled electrically. Accordingly, a supply with electrical energy between the offshore platform and the subsea production system and possibly also a respective data communication has to be possible.

For the purpose of power supply the production platform comprises the data transfer/voltage conversion unit. This unit is connected to the subsea production system and the components thereof via the cable connection.

Usually, a transmission of a predetermined power defined by the data transfer/voltage conversion unit, which is e.g. some KW at some KV takes place. If a higher power supply becomes necessary, even for a short period of time, this requirement can usually not be complied with by known power supply systems. That means that the power supply remains constant so that if an additional component is connected the power supply is reduced for all connected components about the power supply of this connected component, and a sufficient supply of all components is not ensured.

SUMMARY

The invention improves a power supply system of the above-mentioned kind in that it has a simple structure and each data transfer/voltage conversion means can also provide higher powers over a predetermined period of time or also during continuous operation.

According to embodiments of the invention, a plurality of data transfer/voltage conversion units are arranged modularly and at least one additional power supply module to increase the power supply or the electric power can be connected to these units. This enables on the one hand a simple adaptation of the number of data transfer/voltage conversion units in that, depending on requirement and power demand of the subsea production system with its components, further data transfer/voltage converters are used or removed or at least held in stand-by operation in the case of reduced power demand.

At the same time the power supply module can be connected to each individual data transfer/voltage conversion unit so that a higher power output for a predetermined period of time or during continuous operation is possible.

It is possible that the power supply module is connected to one data transfer/voltage conversion unit each or that also several conversion units can be connected. It is also conceivable that a plurality of power supply modules can be connected to a data transfer/voltage conversion unit and the power can be increased thereby e.g. stepwise about a determined amount of KW. This applies analogously to the further data transfer/voltage conversion units.

To further increase the adaptation possibilities and to be able to possibly adapt the data transfer/voltage conversion unit to other conditions in a simple manner, each data transfer/voltage conversion unit may modularly be structured as sub-modules composed of at least one voltage converter and/or power supply and/or data modem and/or communication/data interface. It is possible that these modular sub-units are exchangeable in a simple manner and that for instance a data modem being a modular unit is replaced by a different data modem. This applies analogously to the other sub-modules.

When supplying respective units of the subsea production system, a direct voltage supply is advantageous. To provide respective voltages in the desired level and the desired voltage type, the voltage converter may be an AC/DC converter. However, it is also possible that only the voltage value is modified by the voltage converter e.g. by a DC/DC converter.

If a supply of the power supply system is implemented via a universal power supply (UPS), a three-phase voltage of 415 V is usually supplied to the different data transfer/voltage conversion units. A conversion of the voltage to direct voltage with the desired level is then implemented through the respective voltage converter as sub-module.

The power supply of the data transfer/voltage conversion unit may be a three-phase unit with alternating connections.

A simple supply of a series of data transfer/voltage conversion units and power supply modules may be implemented if they are all connected via a power bus with the three-phase electric power supply UPS, wherein these connections are implemented via the respective power supply.

The data transfer/voltage conversion units do not only serve for supplying the different components of the subsea production system with power but also for transmitting signals or data advantageously in both directions. This may for instance be implemented in that the data modem is a line modem, which feeds the respective data or signals into the cable connection or extracts them therefrom.

In other data transfer/voltage conversion units, such a data modem may also be a glass fiber modem, wherein the transmission of the signals or data is carried out via glass fibers. It is also conceivable that both types of modems are used or can at least be exchanged against one another. Each modem forms a respective sub-module.

To transfer power and data or signals also over greater distances, the cable connection may comprise at least one coaxial cable. It is also possible that the cable connection comprises a plurality of such coaxial cables, each of which being connected to a separate data transfer/voltage conversion unit.

To simplify coupling-in of electrical power and/or data into the respective cable connection, the data transfer/voltage conversion unit may comprise a line coupler for coupling electrical voltage and data into the cable connection.

Both for monitoring the power supply as well as the power need, a voltage conversion control unit may be assigned to the voltage converter. This unit may also serve for reactive power compensation, i.e. for power factor correction (PFC).

A simple realization of a respective power bus may be realized in that this bus is formed as a power bus rail. Such a power bus rail can be connected in a simple manner known per se to the respective modules or sub-modules and other mains adapters.

Different communication/data interfaces can be used for communication with the different modules or sub-modules. Such a data transmission may be implemented e.g. asynchronously or serially, such as CAN (Controller Area Network), wherein in this connection a respective CAN interface is used as sub-module.

Since it is possible that the data or signals are transferred according to a different protocol from the exterior of each data transfer/voltage conversion unit, a bus protocol conversion unit may be connected upstream of the communication/data interface. An example is an Ethernet/CAN gateway as bus protocol conversion unit. In this manner CAN networks may be coupled with Ethernet networks, wherein the transfer of the data and signals is carried out e.g. by a central control means via an Ethernet network to the individual data transfer/voltage conversion units and power supply modules. It is also possible to implement a direct coupling to the Internet via TCP/IP instead of a coupling to an Ethernet network or to jointly use both opportunities.

In order to be able to connect a respective power supply module to the data transfer/voltage conversion unit, this unit may directly comprise a controller for connecting at least one power supply module onto the line coupler. By this, the control of the connection from the data transfer/voltage conversion unit is carried out via for instance a switch associated thereto. The respective control commands may be transferred by the central control means via the Ethernet network to the respective communication/data interface possibly after bus protocol conversion.

In order to be able to control the connection in a simple manner from the outside and particularly by the central control means, a data interface, particularly a CAN-interface may be associated to the controller. This may also be the above-mentioned CAN interface so that possibly only one CAN interface is used for each data transfer/voltage conversion unit.

As already mentioned, the control of the controller can be implemented directly by the central control means. However, it is also possible that a divider unit is associated to this means, which is connected via a data connection at least with the connection means of each data transfer/voltage conversion means. Each of these units can be controlled separately by this conversion means to connect one or several power supply modules.

In this connection, this data connection may also be an Ethernet bus.

To be able to control the power supply modules before or during connection, the divider unit may be connected with the connectable power supply modules. This connection may be carried out accordingly through the Ethernet bus.

The power supply modules are also arranged modularly and are modularly structured of sub-modules, wherein such a power supply module being a sub-module comprises at least one power supply and/or one voltage converter and/or one communication/data interface and/or a voltage conversion unit.

As already mentioned, the divider unit may be part of a central control means or it may be connected therewith. It is also possible to operate the divider unit directly manually to connect e.g. respective power supply modules.

It is possible to connect a respective circuit between the data transfer/voltage conversion unit and the respective electric means of the subsea production system via a further cable connection. However, it is also possible that at least one subsea anode is associated to the data transfer/voltage conversion means, and at least one subsea cathode is associated to the electrical means, wherein sea water between the subsea anode and cathode forms a circuit section of a closed circuit to the electron lines between same.

In oil and natural gas production it is usually required that all respective parts are provided redundantly. This may be carried out according to the invention in that the power supply system is structured redundantly of a number of data transfer/voltage conversion means and connectable power supply modules, wherein for instance two separate systems with respective modules and sub-modules may be provided. The redundancy also continues in the subsea production system sector with the respective electrical means so that independent systems exist.

Sub-modules or single modules of the power supply system that can be easily exchanged and handled may be formed as insertion members for a backplane system. The power bus rail, an Ethernet bus or the like may be part of the backplane system.

It may also prove to be required that not only a respective supply via the cable connection of the individual electrical means takes place but that a discharge particularly of the cable connection formed as coaxial cable is advantageous to discharge a possibly corresponding charged capacitance. This my also be implemented via the data transfer/voltage conversion unit and particularly via the controller by means of switches in that the cable connection can be connected to ground via the data transfer/voltage conversion unit.

The power supply system may also be structured in that not only an electrical means is connected to a data transfer/voltage conversion unit each. Instead, several electrical means may also be connected in parallel and/or in series with the cable connection and thus with the respective data transfer/conversion unit. That means, the electrical means may also be structured modularly, wherein the number of modules is practically limited by the number of addresses available.

To be able to possibly directly switch to further data transfer/voltage conversion units or connectable power supply modules, such modules may be provided as spare modules. They virtually serve as spare units, which in the case of failure of an operating unit can quickly take over their function. Basically, only the cable connection of the failed module has to be plugged onto the spare module. It is also conceivable, when all coaxial cables are switched as a classic matrix, that the coaxial cable is electrically connected to the respective spare module by selecting respective matrix points.

Finally, it must be noted that sub-modules of identical function may have the same structure, i.e. that for instance a CAN interface or a bus protocol conversion unit can be used in each data transfer/voltage conversion unit or in each power supply module. This analogously applies to the other sub-modules. By adding further power supply modules or data transfer/voltage conversion units, the power supply system can be extended in a modular way or it can possibly be minimized. By this modular structure according to the invention, various combination alternatives of the power and data transfer are possible. The different modules or sub-modules are relatively small and can call be linked to one another.

It must also be noted that a maximum power under water is usually only required when initiating the electrical means, particularly the electrical actuators and a basic supply through the data transfer/voltage conversion units is otherwise possible without power supply modules connected. It is also conceivable that different sub-modules are provided as spare modules so that it can simply be switched from a sub-module to such a spare module without the entire system having to be switched off. The sub-module can then be replaced in that it is e.g. switched inactive by means of a software and is then unplugged for repair for instance as a plug-in card.

BRIEF DESCRIPTION OF THE DRAWINGS

An advantageous embodiment of the invention will now be explained in detail by means of the Figures enclosed in the drawing.

DETAILED DESCRIPTION OF THE EMBODIMENTS

Figure 1:
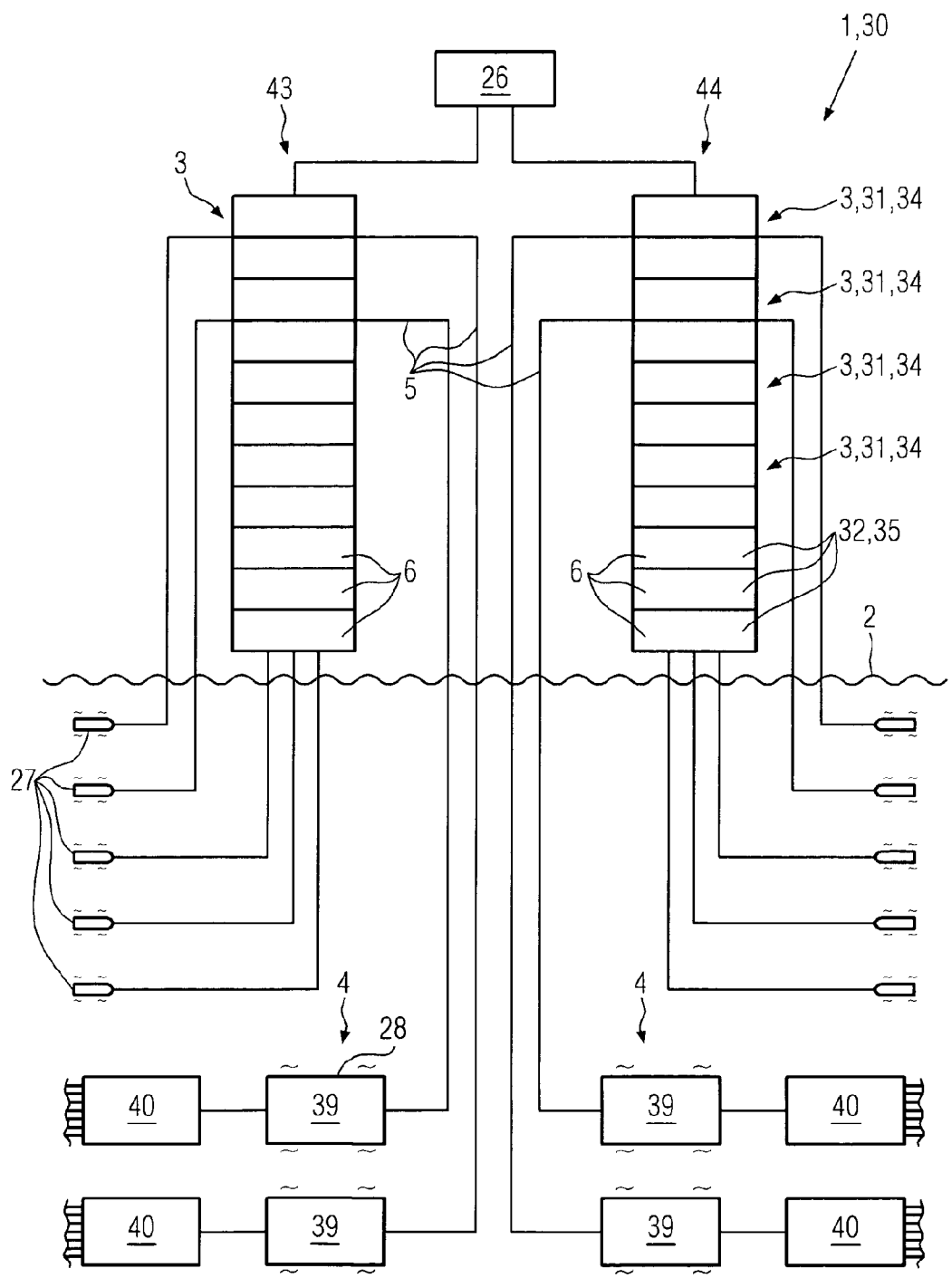
FIG. 1 shows a schematic diagram of a power supply system comprising two redundancy systems.

FIG. 1 shows a schematic diagram of a power supply system 1, which is structured as a modular power supply system 30 and which forms in total a data and power supply system 30 for power control/communication means 39 particularly arranged on the sea bottom and other electrical means. In the embodiment shown, a central control means 26 controls two redundant systems 43, 44, each being composed of a number of first and second modules 31, 32. The first modules 31 are data transfer/voltage conversion units 3 and the second modules 32 are connectable power supply modules 6, which serve as connectable power amplification modules 35. Each of the data transfer/voltage conversion unit 3 is connected via a cable connection 5 with an electrical means 4 on the sea bottom, wherein the first and the second modules 31, 32 are arranged above sea level 2 e.g. on a production platform or the like.

These electrical means 4 include e.g. a power control/communication means 39, which is connected directly to the cable connection 5. This means 39 serves for electric supply and control of at least one local control means 40, which is connected with a plurality of electrical devices for oil/natural gas production, such as valves, throttles, actuators and the like. It is also possible that several of such local control means are connected in series and/or in parallel with the power control/communication means 39.

The data transfer/voltage conversion units 3 as first modules 31 cover a basic power need of the respective means on the sea bottom. When the power need increases, a connection of at least one power supply module 6 as second module 32 of the power supply system 1 takes place. They feed their electrical power also into the respective cable connection 5 between the data transfer/voltage conversion unit 3 and the associated power control/communication means 39.

The respective circuit between the data transfer/voltage conversion unit 3 and/or the power supply module 6 and the power control/communication means 39 is closed by subsea anodes 27 and subsea cathodes 28 and the sea water located therebetween. Such a subsea anode 27 is associated to each first and second module 31, 32, respectively, and a subsea cathode 28 is associated to each power control/communication means 39. The subsea anodes 27 are connected via further cable connections to the associated module, while the subsea cathode 28 can be formed by a part of the housing or the entire housing of the respective power control/communication means 39.

To simplify matters, FIG. 1 does not show all cable connections 5 or further details of the respective modules 31, 32, wherein these further details result from the following Figures.

Respective connections between the local control means 40 and the electronic or electrical devices connected are only shown schematically, wherein the respective electrical or electronic devices may be associated to respective drilling hole or Christmas tree equipments.

Figure 2:
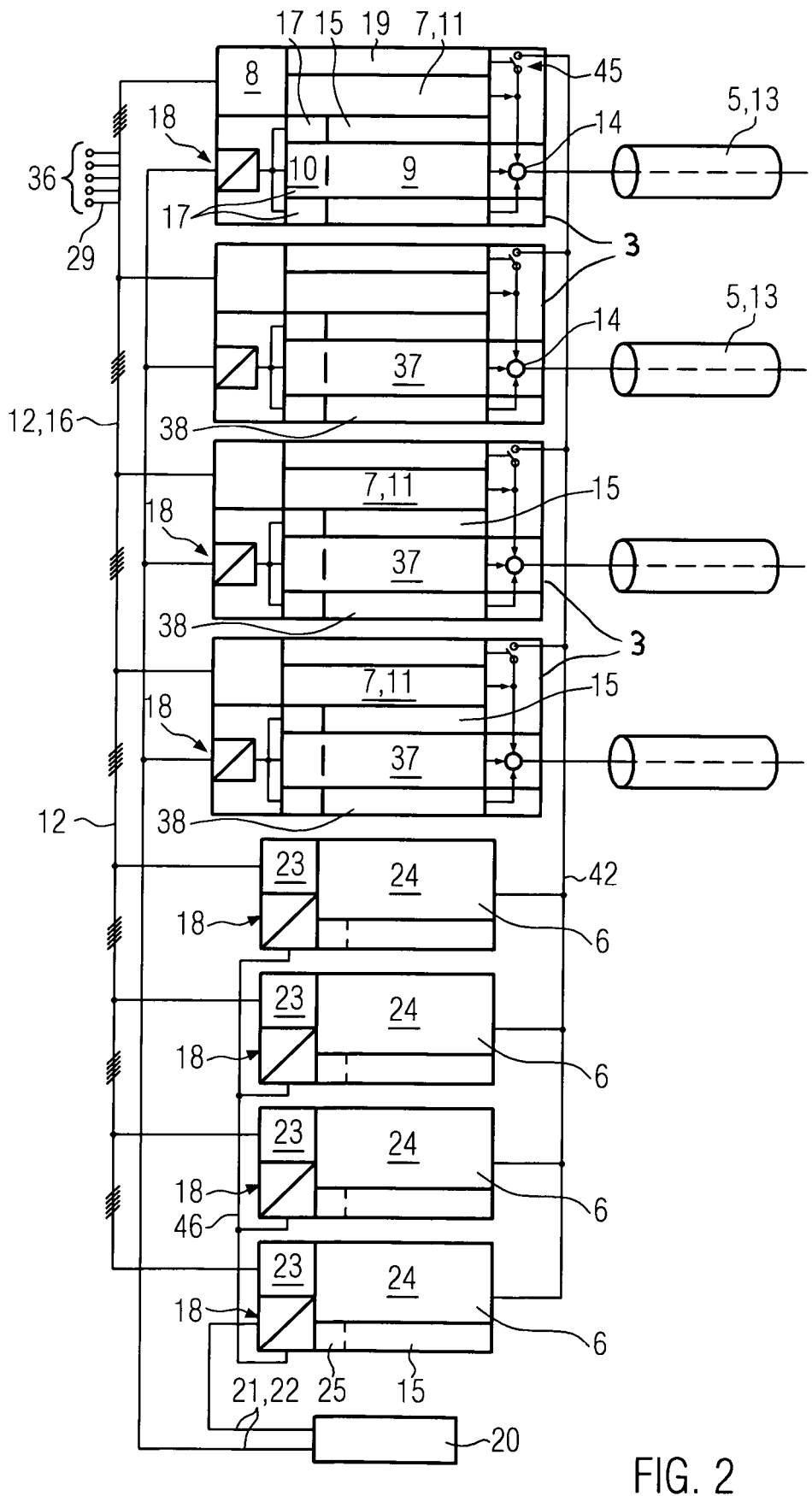
FIG. 2 shows an enlarged view of a redundancy system according to FIG. 1.

FIG. 2 shows the respective first and second modules 31, 32 for at least one system in more detail, wherein to simplify matters the respective connection to and representation of subsea anodes 27 was dispensed with.

To further simplify matters, the control means 26 is not shown in FIG. 2 but only a divider unit 20, which may be part of the central control means or which is at least associated thereto.

In FIG. 2 the first and second modules 31, 32 according to FIG. 1 are characterized as data transfer/voltage conversion units 3 and power supply modules 6, wherein each module is composed of sub-modules.

Such a first module 31 or data transfer/voltage conversion unit 3 is connected on the input side for voltage supply with a universal power supply in the form e.g. of a three-phase electric power supply with connection 36. This supplies three-phase electric power or voltage and also a connection to ground 29. The supply is implemented via a power bus 12, which may be arranged in the form of a power bus rail 16. This power bus 12 is connected to power supply 8 and 23, respectively, of the data transfer/voltage conversion units 3 or the power supply modules 6. Voltage converters 7 in the form of an AC/DC converter and respective voltage converters also usually as AC/DC converters are connected to the respective power supply as first sub-module in the various modules as further sub-modules. A voltage conversion control unit 15 is associated to the respective voltage converters 7 and 24, respectively, said voltage conversion unit also serving for reactive power compensation, i.e. for power factor compensation.

Further sub-modules, which are also used in illustrated data transfer/voltage conversion units 3 and power supply modules 6, are bus protocol conversion units 18 and communication/data interfaces 10 and 25, respectively.

The respective bus protocol conversion units 18 are connected to the divider unit 20 via a data connection line 21. This data connection line 21 is formed as an Ethernet bus 22 in the embodiment shown. To convert the respective protocol of the Ethernet network into a protocol of a different network, which is used within the different modules, bus protocol conversion units 18 are provided. This units serve particularly for the conversion of the Ethernet protocols into CAN protocols. The respective converted protocols can then be transmitted to the CAN interfaces 17 within each module, wherein these CAN interfaces 17 form the respective communication/data interfaces 10 and 25, respectively. Such a CAN interface 17 can be provided centrally for all sub-modules or also for each sub-module. The bus protocol conversion unit 18 employed also makes it possible for the individual data transfer/voltage conversion units 3 to internally communicate via different protocols with respect to one another, yet communicate with another via a common protocol, for example.

A transmission of signals to control e.g. the voltage conversion unit 15, a controller 19 or also data modems 9 is implemented via the respective interface.

The controller 19 controls a switching means 45, which is also provided in each data transmission/voltage conversion means 3. Via this switching means 45 a coupling of one or several of the power supply modules 6 takes place to increase the power supply via respective cable connections 5, see also FIG. 1. A coupling of the line and of signals or data is implemented in this connection by means of a line coupler 14, which is connected to the respective data modem 9, the voltage converter 7 and switching means 45.

The respective cable connection 5 may for instance be formed as a coaxial cable 13, which can advantageously be used both for transmitting electrical power as well as signals and data.

Depending on the type of transmission, the data modem 9 can be formed differently. One possibility is a line modem 37, which couples data and signals via line couplers 14 into the coaxial cable 13. If instead or in combination with the coaxial cable a glass fiber cable is used, the data modem 9 may be formed as a glass fiber modem 38. The respective data modem 9 also forms a sub-module.

In this connection it is possible that the line modem 37 and the glass fiber modem 38 are used alternatively or also in combination.

Regarding the different modules it must be noted that they can be formed as plug-in cards, which can be plugged into a backplane of each module, wherein for instance the power bus 12 and also the Ethernet bus 22 can be integrated in the backplane and contact with the respective bus can directly be established by plugging in the respective plug-in-cards.

Regarding the line modem it must also be noted that this modem serves for transmitting and receiving data and signals via the power supply network, wherein these data and signals can be coupled in by means of a respective modulation of the power supply.

Concerning the bus protocol conversion unit 18 it must also be noted that this unit can for instance be formed as a so-called cold fire processor or Ethernet-CAN gateway, which performs a respective protocol conversion from Ethernet to CAN and vice versa. Such a protocol conversion is required for the connection of different field bus systems or networks and is used for network-based control applications in USB, Ethernet, CAN, TCP/IP.

The second modules 32, see FIG. 1, or power supply modules 6 are also connected via their bus protocol conversion unit 18 with the Ethernet bus 22 and thus with the divider unit 20. This does not only transmit data for operating the switching means 45 to the data transfer/voltage conversion means 3, but also data to modules, which are then e.g. supplied to the voltage conversion control unit 15 for reactive power compensation. Units within the modules can receive power supply from the respective module, for example.

According to FIG. 2 and in the following FIGS. 3, 4 it can be seen that according to the invention not only a modular structure of the power supply system composed of data transfer/voltage conversion units 3 and power supply modules 6 exists, but that these first and second modules 31, 32 are also structured modularly themselves so that a simple extension of the power supply system 1 by additional modules or a modification of each first and second module by other sub-modules is possible. It is also possible to additionally arrange some first and/or second modules in the stand-by operation, which are only used in the case of failure of a module. The respective sub-modules of each module can quickly be exchanged for instance to exchange a damaged sub-module or to modify the structure of a module. All respective sub-modules are structured similarly, i.e. that for instance a bus protocol conversion unit 18 of a power supply module 6 can also be used for a data transfer/voltage conversion unit 3, wherein this analogously to the other sub-modules.

Figure 3:
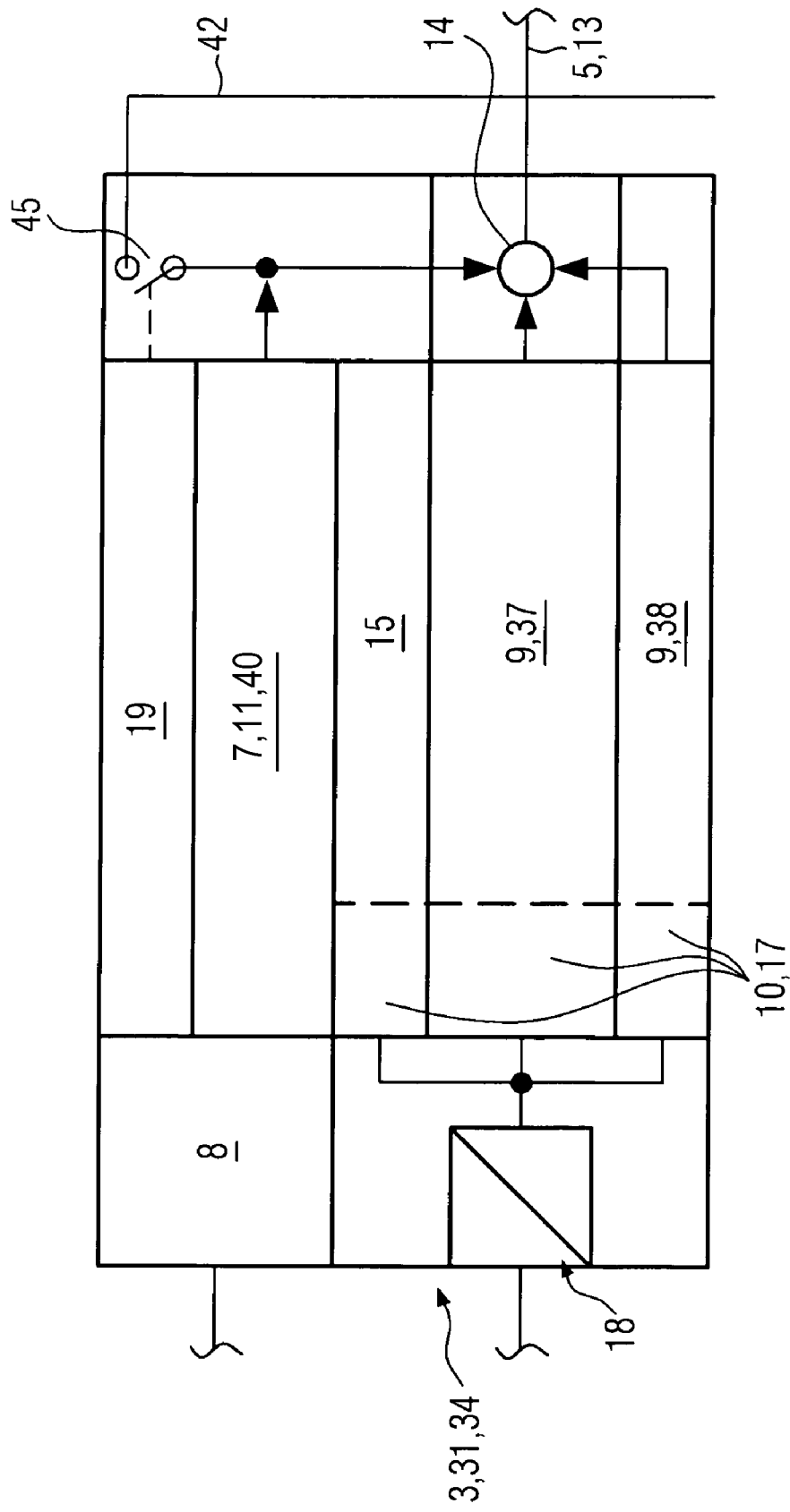
FIG. 3 shows an enlarged view of data transfer/voltage conversion unit according to FIGS. 1 and 2.
Figure 4:
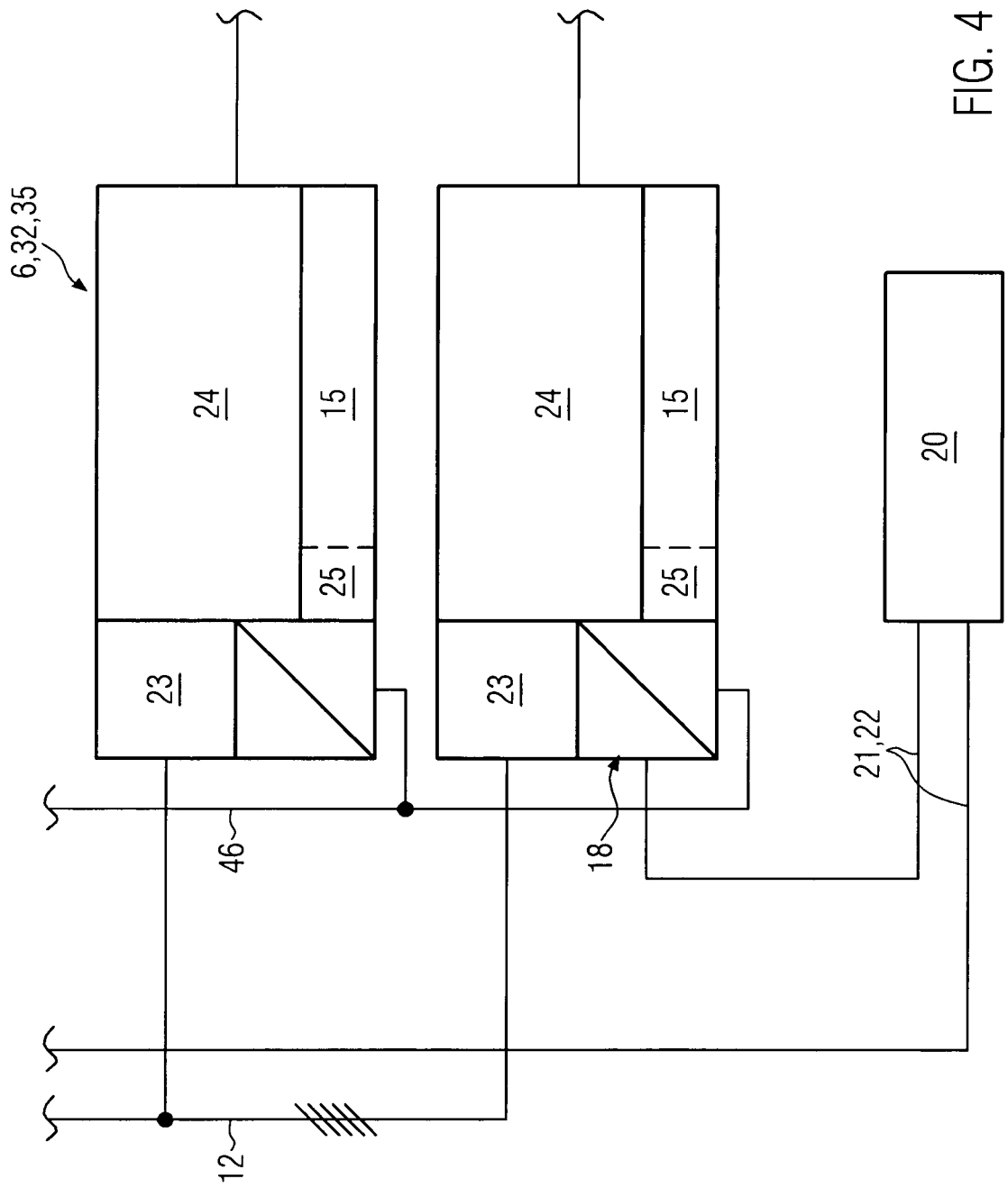
FIG. 4 shows an enlarged view of a power supply module according to FIGS. 1 and 2.

In FIG. 3 a first module or a data transfer/voltage conversion unit 3 is shown in enlarged scale for further explanation. Identical reference numerals characterize in this Figures, as in all remaining Figures, identical parts and are partly explained in detail only in connection with a Figure.

The first module 31 forms a data transfer/power supply module 34 with different sub-modules, such as a power supply 8, controller 19, voltage converter 7 in the form of an AC/DC converter 11, voltage conversion control unit 15 and data modem 9. The data modem 9 may be a line modem 37 and/or a glass fiber modem 38.

Depending on the type of transmission of data and signals, the one or the other modem 37, 38 is used. The sub-modules according to FIG. 3 to be controlled, see particularly reference numerals 15 and 9, comprise a connection with a communication/data interface 10 in the form e.g. of a CAN interface 17. Such an interface may also be provided separately for each of the previously mentioned sub-modules. Each communication/data interface 10 is connected to the bus protocol conversion unit 18, which for instance carries out the protocol conversion between Ethernet network and CAN network.

On the output side, the first module 31 has a line coupler 14 by means of which power and data/signals are coupled into the cable connection 5. The power coupled in may be supplied as primary supply directly from the voltage converter 7 of the first module or also with increased power by connecting at least one power supply module by means of switching means 45. By connecting one or a plurality of such power supply modules 6, also see FIG. 4, the power supply can be increased e.g. in steps of a few KW in addition to the primary supply by voltage converters 7 and thus by the first module 31.

The transfer of the power from the power supply modules 6 as second modules 32 is carried out via a connection line 42, which may also be formed as bus line. All power supply modules 6 are connected with this bus line 42. In FIG. 4 two power supply modules 6 are shown as second modules 32 of FIGS. 1 and 2 in enlarged scale for further explanation.

Each power supply module 6 comprises a voltage converter 24 as sub-modules, which can be formed as an AC/DC converter, a voltage conversion control unit 15 and an associated communication/data interface 25. This interface is in connection with the bus protocol conversion unit 18, wherein a conversion of the Ethernet protocol into a CAN protocol is carried out by the latter. The bus protocol conversion unit 18 is connected to the divider unit 20 via a data connection in the form of an Ethernet bus 22. The different CAN outputs of the bus protocol conversion unit 18 are connected on the one hand with the communication/data interface 25 and on the other hand via a CAN bus 46 to the further bus protocol conversion units 18. In this manner only one power supply module 6 is connected to the divider unit 20 via the Ethernet bus 22, while the power supply modules are connected among one another via the CAN bus 46 for further control according to the signals received by the divider unit 20.

Each of the power supply modules 6 also has a power supply 23, which is connected to the power bus 12 and via this power bus to the connection 36, see FIG. 2, to be connected to a three-phase electric power supply.

The power supply system according to the invention will now briefly be described by means of the enclosed Figures.

The power supply system is in total structured redundantly, see the different systems 43 and 44. Both systems are completely independent and are controlled and managed by the superordinate central control means 26 by means of respectively installed software. The supply of the systems 43, 44 is also implemented separately via two independent universal power supply means, see connection 36 in FIG. 2.

Only some of the first and second modules are shown in the Figures, wherein their number can also be increased or reduced, depending on requirement.

A first module is connected via a cable connection with the power control/communication means 39 on the sea bottom or at least below sea level. The means below sea level are structured modularly and, depending on the amount of addresses available for addressing each means, more or less means can be provided.

The modular structure of the power supply system is continued in each first and second module, wherein all sub-modules 8, 19, 7, 15, 10, 9 or 18 as well as 23, 24, 25 are identical in construction, i.e. as long as the same function exists, e.g. each power supply 18 may replace a different power supply 18 as sub-module.

The respective subsea units are supplied with the required power by the first and second modules. As long as a base load of some KW is sufficient, the supply of a data transfer/voltage conversion unit 3 to the associated subsea unit takes place. If the base load does no longer suffice, a connection of one or a plurality of power supply modules 6 takes place, by which the basic supply can be increased in steps of e.g. some KW. Such an increase of the power supply is for instance required if a subsea valve is opened through an actuator. Closing can in this connection be implemented by a power-depending means such as a spring or the like.

It is possible that some of the first and second modules are in stand-by operation and are used only in the case of failure or maintenance of one of the other modules.

The first and second modules are all connected via the power bus 12 to the connection 36 for voltage supply. Furthermore, an Ethernet bus 22 exists on the input side, said bus supplying all modules with data and signals for control and coordinates same by means of software. Each module has a bus protocol conversion unit 18 in the form of an Ethernet-CAN gateway or bold fire processor to be able to carry out a protocol conversion between the Ethernet network and the CAN network. The respective signals are then forwarded to the CAN interface 17 which also exists in all modules.

Respective sub-modules can comprise such a CAN terminal, wherein the sub-modules are for instance formed as plug-in cards for a respective backplane with associated power supply bus.

On the output side all modules are connected with the connection line 42 which can also be formed as a bus.

A coupling to the coaxial line 13 as cable connection to the subsea units is implemented through the power coupler 14. Coupling is not only implemented with respect to the power supply but also with respect to data and signals to be exchanged. The power supply may be varied by connecting respective power supply modules 6, see switching means 45 with controller 19.

In this connection it must also be noted that each coaxial cable also can be connected through the associated data transfer/voltage conversion unit with ground 29. It may e.g. be used for discharging the coaxial line to be able to discharge static energies stored by such a line to the ground.

The line coupler 14 also serves for coupling in the data and signals, which are modulated in addition to the energy transmission, see the above statements. Thereby each subsea unit can be controlled individually.

On the whole, a power supply system is obtained in which all combination possibilities of power and data transfer can be realized in a simple and quick manner by use of modules and sub-modules. Furthermore, the power supply system is very variable and failure-proof due to the use of more or less modules and by using respective sub-modules, wherein for redundancy reasons similar sub-modules may for instance also be provided in each module so that one of these sub-modules can quickly replace a failed sub-module by means of software or by re-plugging cables.

While the invention may be susceptible to various modifications and alternative forms, specific embodiments have been shown by way of example in the drawings and have been described in detail herein. However, it should be understood that the invention is not intended to be limited to the particular forms disclosed. The invention is to cover all modifications, equivalents, and alternatives falling within the spirit and scope of the invention as defined by the following appended claims. Additionally, usage of the term "present invention" or "invention" generally refers to exemplary embodiments of the claimed invention and, as such, subsequent descriptors are not necessarily requirements for every embodiment encompassed by the claims of this application.

The invention claimed is:

1. A power supply system particularly to be used in maritime oil/natural gas production including:
    a plurality of data transfer/voltage conversion units capable of both data transmission and voltage conversion arranged modularly above sea level;
    an electrical means arranged below sea level;
    the data transfer/voltage conversion units and the electrical means being connected via a cable connection at least for power supply;
    a power supply module connected to the data transfer/voltage conversion units; and
    at least one additional power supply module selectively connectable with the data transfer/voltage conversion units to increase the electrical power available to the electrical means.

2. The power supply system as claimed in claim 1, where each data transfer/voltage conversion unit is structured modularly of at least one of a voltage converter, power supply, data modem, and communication/data interface.

3. The power supply system as claimed in claim 2, where the voltage converter includes an AC/DC converter.

4. The power supply system as claimed in claim 2, where the each data transfer/voltage conversion unit includes a power supply including a three-phase unit with an alternating connection for a three-phase electric power supply.

5. The power supply system as claimed in claim 4, further including a power bus arranged for connection between the power supply and the alternating connection.

6. The power supply system as claimed in claim 5, where the power bus includes a power bus rail.

7. The power supply system as claimed in claim 2, where each data transfer/voltage conversion unit includes a line modem.

8. The power supply system as claimed in claim 2, where the each data transfer/voltage conversion unit includes a glass fiber modem.

9. The power supply system as claimed in claim 2, further including a voltage converter capable of power factor correction.

10. The power supply system as claimed in claim 2, further including a communication/data interface including a CAN interface.

11. The power supply system as claimed in claim 2, further including a bus protocol conversion unit arranged upstream of a communication/data interface.

12. The power supply system as claimed in claim 11, where the bus protocol conversion unit includes an Ethernet/CAN gateway.

13. The power supply system as claimed in claim 1, where the cable connection includes a coaxial cable.

14. The power supply system as claimed in claim 1, where the data transfer/voltage conversion unit includes a line coupler for coupling electrical voltage and data into the cable connection.

15. The power supply system as claimed in claim 14, where each data transfer/voltage conversion unit includes a controller for connecting at least one power supply module to the line coupler.

16. The power supply system as claimed in claim 15, further including a data interface, particularly a CAN interface, associated with the controller.

17. The power supply system as claimed in claim 15, further including a divider unit connected via a data connection to the controller of each data transfer/voltage conversion unit.

18. The power supply system as claimed in claim 17, where the data connection includes an Ethernet bus.

19. The power supply system as claimed in claim 18, where the power supply module further includes a communication/data interface and the divider unit is connected to the communication/data interface particularly via the Ethernet bus.

20. The power supply system as claimed in claim 17, where the divider unit is connected to the power supply modules.

21. The power supply system as claimed in claim 17, where the divider unit is connected to a central control means.

22. The power supply system as claimed in claim 1, where the power supply module includes at least one of a power supply, voltage converter, communication/data interface, and a voltage conversion unit.

23. The power supply system as claimed in claim 1, where at least one subsea anode is associated to the data transfer/voltage conversion unit and at least one subsea cathode is associated to the electrical means, and where sea water between the subsea anode and cathode forms a circuit section of a closed circuit between the anode and the cathode.

24. The power supply system as claimed in claim 1, further including multiple connectable power supply modules such that the data transfer/voltage conversion units and the connectable power supply modules are structured for redundancy.

25. The power supply system as claimed in claim 1, where all the individual modules of the power supply system are arranged as insertion members for a backplane system.

26. The power supply system as claimed in claim 1, where the cable connection can be connected to ground via the data transfer/voltage conversion unit.

27. The power supply system as claimed in claim 1, where a plurality of electrical means are connected in parallel and/or in series with the cable connection.

28. The power supply system as claimed in claim 1, where at least one of the data transfer/voltage conversion units and the connectable power supply modules are arranged as spare modules.

29. The power supply system as claimed in claim 1, where the electrical means includes at least one of a choke, gate valve, production tree, and power control/communication means.

30. A modular power supply system, particularly to be used in maritime oil/natural gas production, including:
    first modules including data transfer/voltage conversion means capable of both data transmission and voltage conversion;
    second modules including connectable power supply modules;
    where each first module is connected via a cable connection to an electrical means arranged below sea level; and
    where second modules can selectively be connected to each first module to increase the electrical power.

31. The modular power supply system as claimed in claim 30, where at least one of the second modules can be connected to at least one of the first modules.

32. The modular power supply system as claimed in claim 30, where the increased electrical power can be transferred by at least one of the second modules through the cable connection connected to at least one of the first modules.

33. The power supply system as claimed in claim 30, where the electrical means includes at least one of a choke, gate valve, production tree, a power control and communication unit.

34. A data and power supply system for use in maritime oil/natural gas production, including:
    a number of data and power supply modules and connectable power supply modules;
    where each data and power supply module is connected via a cable connection to an electrical means arranged below sea level to transmit data and electrical power.

35. The data and power supply system as claimed in claim 34, where at least one of the connectable power supply modules can selectively be connected to at least one of the data and power supply modules.

36. Data and power supply system as claimed in claim 34, where each of the data and power supply modules is formed as a data transfer/voltage conversion unit of at least one of a communication/data interface, power supply, voltage converter, and data modem.

37. The data and power supply system as claimed in claim 34, where electrical power of the connectable power supply modules can additionally be transferred via the cable connection connected to the data and power supply modules.

38. The power supply system as claimed in claim 34, where the electrical means includes at least one of a choke, gate valve, production tree, and power control and communication means.

* * * * *